May 15, 1962  HIDEYO WATANABE  3,034,197
PROCESS OF MANUFACTURING EXPANDED STEEL MEMBER
Filed March 20, 1957  3 Sheets-Sheet 3

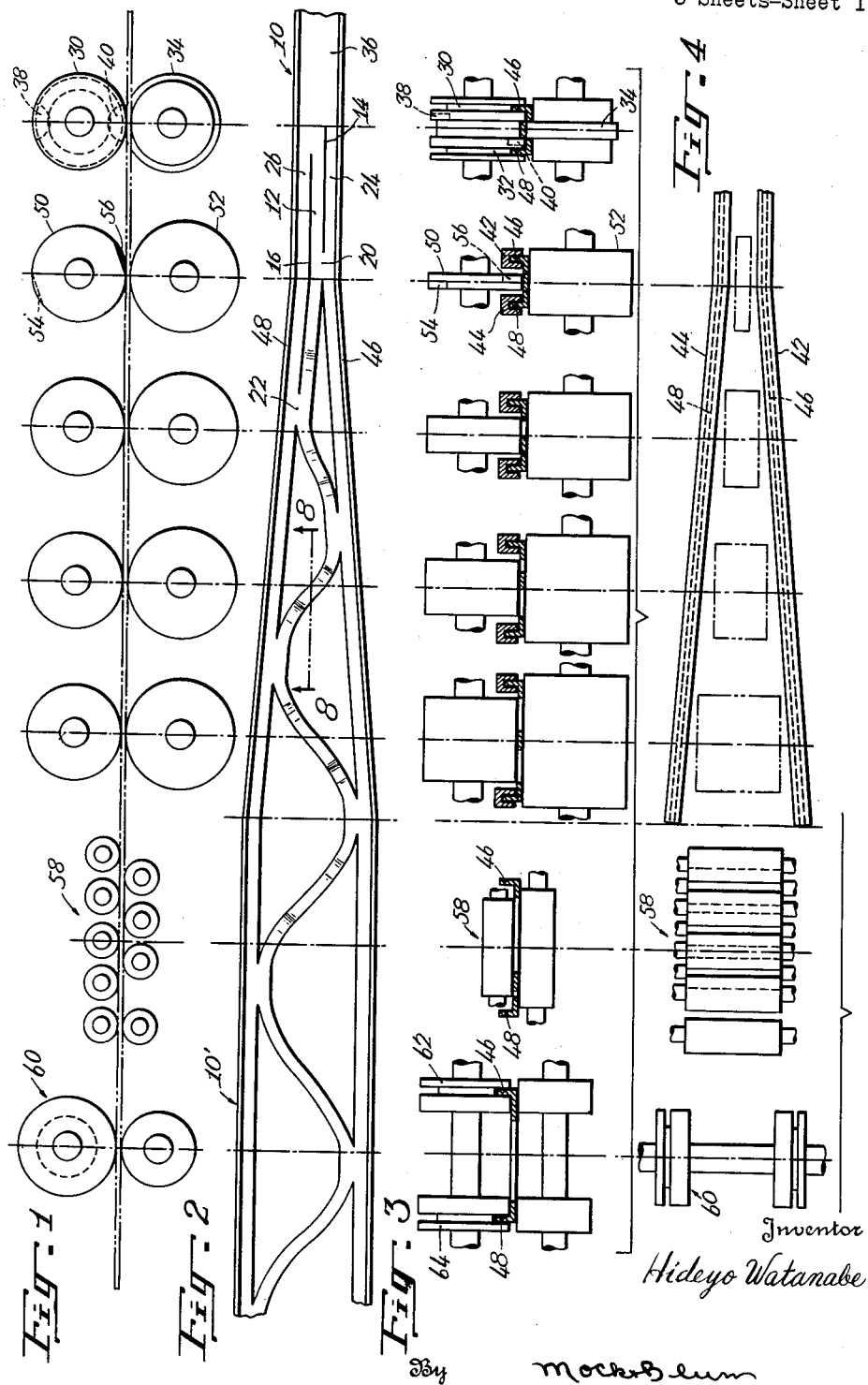

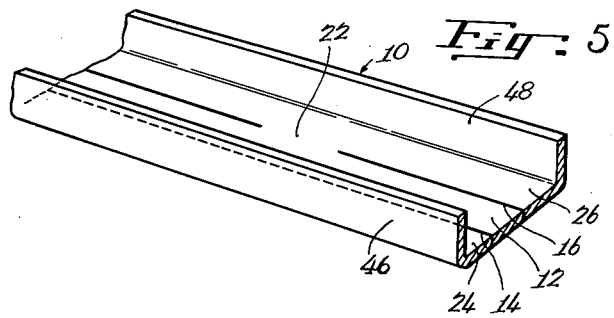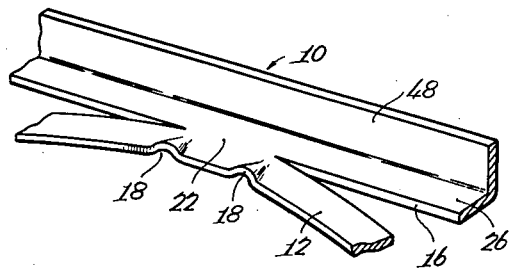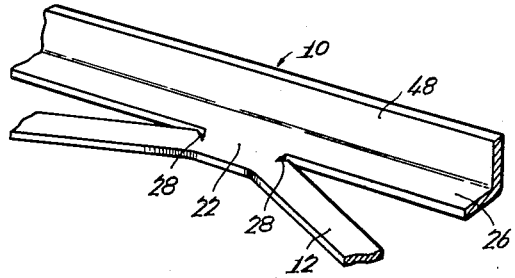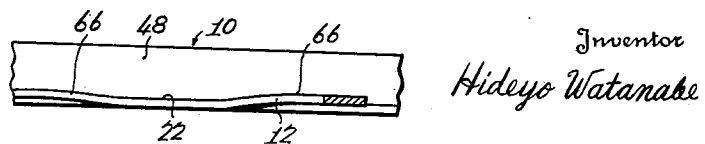

Inventor
Hideyo Watanabe
By Mock & Blum
Attorneys

United States Patent Office 3,034,197
Patented May 15, 1962

3,034,197
PROCESS OF MANUFACTURING EXPANDED STEEL MEMBER
Hideyo Watanabe, 16 Shinsen-cho, Shibuya-ku, Tokyo, Japan
Filed Mar. 20, 1957, Ser. No. 647,435
Claims priority, application Japan Aug. 30, 1956
1 Claim. (Cl. 29—6.1)

The present invention relates to a process of manufacturing expanded steel members by means of a continuous, cold-rolling process, and to apparatuses required for performing such process, and it also relates to the products of the process.

Heretofore, it has been usual that truss-like constructions are manufactured by means of combining many members. Some of them are manufactured by means of expanding such a single member as an I beam, etc., but such fabrication has involved hot-working. These products are rather thick members. However, when rather thin members are required, it would be advantageous that the starting material be selected from products of a strip mill and the fabrication be effected solely by cold working.

Heretofore, such products as so-called studs, joists, etc. have been manufactured by process involving riveting, welding, or sometimes punching. In the punching process, the latticed members are made by means of punching from a web of a channel. It is apparent that an appreciable quantity of material is wasted by this process.

In the welding process, the latticed members are connected with side members by means of welding with the undesirable corollaries of poor and unreliable welds and excessive manufacturing time. This process also is not performed continuously.

In the riveting or pin-connecting process, it is clear that the process is troublesome and costly. It is also apparent that this process is not performed continuously.

These is a process of manufacturing metal lath or expanded metal wherein slitting and expanding are performed by a common tool. In an apparatus to perform such process, the essential portions are adapted to reciprocate or oscillate, with resultant sharp decelerations at the ends of strokes. In addition, the products are limited in length by the length of the fabricating machine. Furthermore, bending of the latticed part edgewise and formation of flanges cannot be done by this process.

The herring-bone lath is another well known product. It is rather similar to the product of this invention except for an essential difference therebetween. That is the fact that the former is expanded merely by bending, and the expanded metal can not be used as structural members. If one wants to use such expanded metal as structural members, the latticed part must be bent edgewise.

One object of this invention is to provide a method whereby trusses as structural members are manufactured continuously.

Another object of this invention is to provide a method wherein heating is not required.

Still another object of this invention is to provide a method whereby trusses are manufactured by a mass-production method and, in turn, inexpensively.

Further another, object of this invention is to provide a method wherein material is not wasted.

For an understanding of the principles of the invention, reference is made to the following description of typical embodiments thereof as illustrated in the accompanying drawings. In the drawings:

FIG. 1 is a side elevational view of apparatus for performing the method of the invention;

FIG. 2 is a plan view of a structural member during formation by the apparatus of FIG. 1, this plan view being coordinated with the elevational view of FIG. 1;

FIG. 3 is a series of transverse vertical sectional views of FIGS. 1 and 2, coordinated with FIGS. 1 and 2;

FIG. 4 is a series of partial plan views of portions of the apparatus of FIG. 1, coordinated with FIG. 1;

FIGS. 5 and 6 are partial perspective views of the structural members shown in FIG. 2, illustrating the latter during various stages of its formation;

FIG. 7 is a view, similar to FIG. 6, illustrating defects which occur when the flat elements forming the lattice work of the web are not expanded lengthwise while the web is being expanded laterally;

FIG. 8 is a longitudinal vertical sectional view, on the line 8—8 of FIG. 2, illustrating the effect of excess rolling on a latticed member;

Like numerals indicate like parts throughout the drawings.

Figure 9:
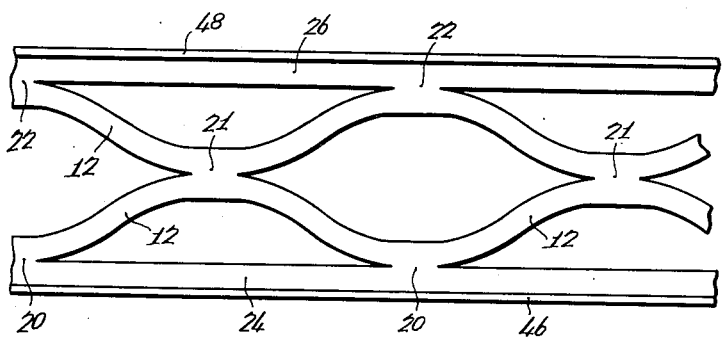
FIG. 9 is a partial plan view, corresponding to FIG. 2, of another from of structural member produced in accordance with the invention.

In accordance with the invention, a steel structural member is formed by cold working and expanding a flanged elongated steel structural member, including an initial step of passing the member between a pair of slitting rolls to form a plurality of rows of slits cut through the member, with each row having individual slits spaced therealong. Each individual slit terminates or ends near the middle portion of the respective individual slits in the next adjacent row. The thus slitted member is then simultaneously passed through side guides and opposed pairs of pressure rolls, with the guides gripping the side flanges of the member and progressively pulling the flanges apart, while the pairs of pressure rolls, which are longitudinally positioned at stations along the expanding extent of the guides, pressure roll irregularities out of the center expanding web of the member. This center expanding web is a lattice work of strand-like flat elements which continuously curve transversely to and fro along the longitudinal extent of the thus expanded member.

During the course of developing the present method, an attempt was made to provide a structural member by first forming such slits in the web thereof and then expanding the web laterally by pressure exerted on the flanges. No attempt was made to lengthen the web lattice forming flat elements. The result of this procedure was that cracks occurred at the connecting points of the lattice forming elements with the substantially coplanar side portions 26 adjacent the flanges 48, as illustrated in FIG. 7.

According to this invention, the latticed members are extended longitudinally prior to each expanding operation so that the latticed member is made longer than the corresponding side member. By virtue of such extension, the latticed member is prevented from any occurence of lateral buckling and cracking at the connecting points of the latticed member with the side member when the subsequent expanding operation is effected by the flanges of the channel. Thus it is made easy to expand in a direction at right angles to the edges of the latticed member and is made feasible to shape the lattice.

The rolling operation by means of passing the member between rolls, is applied to the latticed web elements only, for expanding the channel and extending the latticed members uniformly under compression only but not under tension.

Following the initial steps of slitting and simultaneously expanding and pressure rolling the member, the expanded member is passed through a plurality of levelling rollers which flex the expanded web to and fro substantially perpendicular to the flat bounding planes extending on the proper portions of the lattice work web. Then the thus levelled and previously expanded member is passed through a pair of flanged truing and straightening rollers whereby the final repeatedly cold worked levelled and expanded member is integrally one piece and produced without occasioning scrap from the initial structural member.

The reason why the latticed web elements only are repeatedly subjected to rolling is to prevent any occurence of lateral buckling due to a sudden extension if the extension required for the expansion is made by stretching the lattice elements, this lateral buckling resulting in local wrinkles which would be impossible to remove. Thus, in accordance with this invention, extension of the lattice elements is effected in increments at each rolling stand. Now referring to FIG. 5, a channel 10 has been slitted so as to form a latticed member 12 between two series of slits 14 and 16. In FIG. 6, a latticed member 12 is shown, which has been expanded after an extension was given thereto according to this invention. Two slight wrinkles 18 are found at the proximity of the connecting point 22 of the latticed member 12 with the side member 26. It is possible to resolve the wrinkle 18 by the following rolling operation, while cracks 28 may occur instead of the wrinkle 18 if a latticed member 12 is expanded by means of a mere expansion as shown in FIG. 7. Thus the repetition of both rolling and expanding operations is necessary to yield a good product.

Now an embodiment of this invention will be explained. The primary starting material of the process according to this invention is a coil of strip metal. A strip of 1.6 mm. in thickness and 50 mm. in width was fabricated into a channel 10 of 30 mm. in width having flanges of 10 mm. in height, respectively, by means of passing the strip between flanging rolls of the cold roll forming machine. For example, four stands are provided as usual for this purpose but are not shown in the accompanying drawings. Preferably, the flange may be bent from the strip up to an angle slightly over 90° so as to serve for the expansion forces applied at the flanges.

Referring to FIGS. 1 to 4, the channel 10 is made to pass between a pair of slitting rolls 30 and 32 on one surface of the well, and one double-edged slitting roll 34, on the other surface of the web at the fifth stand, whereby two series of slits are cut in the web 36 of said channel 10.

In order to slit in such a manner as to form the lattice structure, slitting by cutting roll 30 is effected with a phase difference of 180° with respect to slitting by the other cutting roll 32. That is to say, the cutting rolls 30 and 32 have recesses 38 and 40, respectively, which are spaced 180° with each other. By virtue of such precision of the fifth stand, a potential latticed member 12 is formed in the web 36 of the channel 10. The latticed member 12 is integrally connected with both side members 24 and 26 at connecting points 20 and 22, respectively. The slitted channel 10 is guided by a pair of diverging side guides 42 and 44. The guides 42 and 44 are arranged along both side of a series of several expanding stands which will be referred to hereinafter. The guides 42 and 44 are adapted to slidable grip or embrace the flanges 46 and 48 of the slitted channel 10 so as to guide the latter. Furthermore, the guides 42 and 44 diverge with respect to each other so as to expand the slitted channel 10.

Guided by the guides 42 and 44, the slitted channel 10 is made to pass through a nip between a pair of rolls 50 and 52 of the sixth stand or the first expanding stand. At this stand the latticed member 12 only is worked with pressure. In order not to compress the connecting points 20 and 22, flats 54 and 56 are provided in the periphery of the roll 50, having a spacing 180° with each other and being of 0.3–0.5 mm. in depth.

As the channel 10 progresses from the sixth stand to the next stand, called the seventh stand and which is similar to the sixth stand but wider than it, in conformity with the divergence of the guides 42 and 44, the slitted channel 10 is expanded in such a manner that the expansion does not exceed the extension given to the latticed member 12 by the sixth stand. In order to provide the required width of the expanded member, the extension and the subsequent expansion may be repeated several times, for example four times in this example, at eighth and ninth stands and by the continuous guides 42 and 44.

Beyond the ends of the guides 42 and 44, the channel 10, now fabricated into a truss 10′, is passed through a leveller stand 58 for the latticed web elements and then a truing and straightening stand 60 for the side members 24, 26 and the flanges 46, 48.

Two side rolls 62 and 64 of the straightener 60 are adapted to engage with the flanges 46 and 48 in such a manner as to be movable axially. Finally the product is sheared at any length by an automatic cut-off machine (not shown). If each longitudinal extension given to the latticed web 12 by the expanding stand is exactly compensated by the continuous lateral expansion, provision of the leveller 58 may be omitted. Alternatively, a lattice element 12 may be expanded up to 20 percent of its length in advance of each lateral expansion. In general, the coil of strip, the primary starting material, is not of uniform thickness.

In the illustrated example, the finished truss 10′ is 90 mm. in width, having a latticed web 12 of 280 mm. in pitch and 10 mm. in width and flanges 46 and 48 of 10 mm. in height. It is possible to have the lattice angle approach a value of the order of 30 degrees. This finished truss cost about 40 percent of the prime cost of a corresponding punched truss on the market.

As another example, a somewhat non-uniform coil of strip of 3.2 mm. in thickness and 120 mm. in width was fabricated into a channel having flanges of 35 mm. in height, respectively, by means as set forth above. In this example, the material was worked similarly, with equipment similar to that of the preceding example except as follows:

In this example, an excess extension is given to the latticed web 12 of the slitted channel 10 at each expanding stand, so that each longitudinal extension is not fully compensated by the continuous expansion by means of the guides 42 and 44 before latticed web 12 arrives at the following stand. A certain extent of slacking 66 of the latticed member 12 may be found always during the expansion operation, as shown in FIG. 8. By virtue of this slacking 66, or of the excess extension, the non-uniformity of the material is absorbed so as to protect the connecting points 20 and 22 from any damage, such as a crack 28. This slacking 66 is resolved easily at the leveller 58 after the expansion has been completed.

The finished truss of this embodiment is 180 mm. in width, having latticed elements 12 of 20 mm. in width and 360 mm. in pitch and flanges 46 and 48 of 20 mm. in height. This finished product was produced at a speed of 10 m. per minute.

To reduce the invention to practice, five mills were designed and three of them have been operated experimentally. Each mill comprises a channel-forming stage, a slitting stage, an expanding stage, a levelling stage, and a truing or straightening stage. The expanding stage comprises four stands, each of which comprises two rolls, the top roll and the bottom roll. Both top and bottom rolls are driven by means of gears engaging with each other. Preferably the top roll is smaller than the bottom roll in diameter. The following table shows the data for these mills.

*Table 1.—Data for Mills Designed*

|  | No. 1 | No. 2 | No. 3 | No. 4 | No. 5 |
|---|---|---|---|---|---|
| Roll Shaft Diameter (mm.) | 35 | 40 | 50 | 60 | 70 |
| Working Width (mm.) | 150 | 200 | 230 | 400 | 1,250 |
| Height of Stands (mm.) | 400 | 500 | 600 | 600 | 600 |
| Space between Stands (mm.) | 235 | 330 | 377 | 380 | 380 |
| Vertical Space between Axles (mm.) | 145–75 | 210–120 | 200–130 | 210–140 | 210–140 |
| Horse-power | 10 | 15 | 20 | 30 | 40 |

Other than the above-mentioned finished truss which may be called the W-shaped truss, the X-shaped truss may be produced, as shown in FIG. 9. In order to produce such an X-shaped truss by means of this process and the apparatus, only the fifth or slitting stand must be modified slightly.

Figure 11:
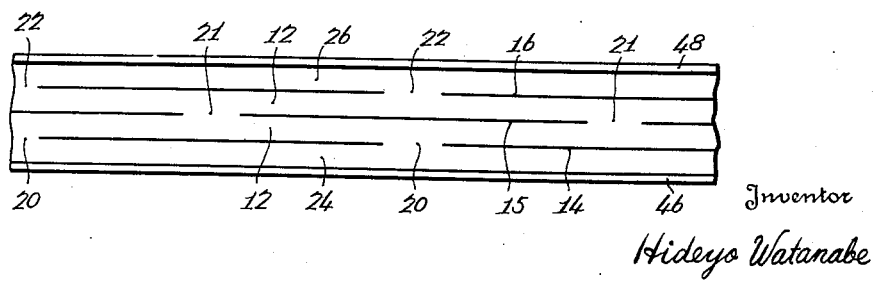
FIG. 11 is a plan view of the channel member used in forming the structural member of FIG. 9, illustrating the condition after formation of the slits therein but before expansion of the slitted member.

Instead of two series of slits 14 and 16 to be made in the web 36 of the channel 10, three series of slits 14, 15, and 16 are cut, as shown in FIG. 11. The latticed members 12 are arranged longitudinally symmetrically. The central slits 15 are staggered symmetrically longitudinally with respect to the right and left slits 14 and 16, so as to provide areas 21 at substantially the centers of the slits 14 and 16 to connect the right portion of the latticed member with the left one at a series of central connecting points along the longitudinal center of the truss 10'. It may be seen that the slitting rolls 30 and 32 and the double-edged slitting roll 34 must be modified slightly.

Figure 10:
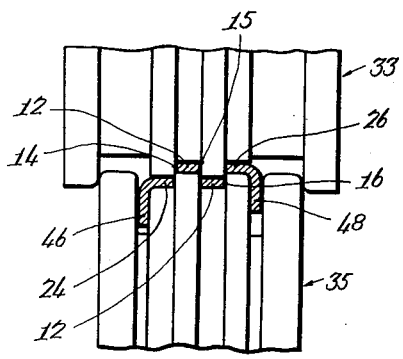
FIG. 10 is a partial transverse vertical section through a pair of slitting rolls illustrating the operation thereof in forming slits in a flanged member.

In order to fabricate slits 14, 15, and 16 in a web of a channel so as to provide two side members 24 and 26 and two latticed members 12, as shown in FIG. 10 wherein flanges 46 and 48 have been fabricated downwards, another type of slitter is provided. This slitter comprises two cutting rolls 33 and two double-edged rolls 35. It may be seen that these cutting rolls and double-edged rolls should have a relative phase displacement of their cutting edges so as to slit as shown in FIG. 11.

Recesses or flats provided along the cutting peripheries of these rolls leave the connecting points 20, 21 and 22 in the latticed members 12 and between the respective series of the slits 14, 15, and 16.

As experimental work according to this invention, I have produced a W-shaped truss of 1.6 mm. in thickness and 90 mm. in width, and also four X-shaped trusses of 20 mm., 2.0 mm., 2.8 mm., and 3.2 mm. in thickness and 10 mm., 120 mm., 180 mm., and 180 mm. in width, respectively. The results of a concentrated load test for these products are given in Table 2.

*Table 2.—Concentrated Load Test*

(Span: 200 cm.)

| Sample | | Limit of Elasticity | | Start of Buckling | | Maximum Load | |
|---|---|---|---|---|---|---|---|
| Shape | Thickness (mm.) | Width (mm.) | Load (Kg.) | Strain (mm.) | Load (Kg.) | Strain (mm.) | Load (Kg.) | Strain (mm.) |
| X | 2 | 120 | 150 | 7 | 203 | 14 | 205 | 15.5 |
| X | 1.6 | 120 | 78 | 5.6 | 99 | 8.6 | 109 | 16.5 |
| W | 1.6 | 90 | 55 | 4.2 | 68 | 5.8 | 92 | 13 |
| X | 1.2 | 120 | 39 | 3.6 | 59 | 7.0 | 75 | 14 |

This table shows that the X-shaped truss of 2 mm. in thickness is preferable for the beam and that of 1.2 mm. is not to be used under a load.

Many modifications within the scope of the invention described above will be apparent to those skilled in the art without a departure from the inventive concept.

I claim:

A method of cold working and expanding a flanged elongated steel structural member comprising the steps of: passing said member between a pair of slitting rolls whereby a plurality of rows of slits are cut through said member and each such row has individual slits spaced therealong which each end near the middle portion of the respective individual slits in the next adjacent row; simultaneously passing the thus slitted said member through side guides and opposed pairs of pressure rolls, said guides gripping the side flanges on said member and progressively pulling said flanges apart while said pairs of rolls, which are longitudinally positioned at stations along the expanding extent of said guides, pressure roll irregularities out of the center expanding web of said member having a lattice work of strand-like flat elements which continuously curve transversely to and fro along the longitudinal extent of said thus expanded member and have cracks at the connection places in said lattice work, which cracks are not individually completely across any one of said flat elements; and passing said thus expanded member through a plurality of levelling rollers which latter flex said thus expanded member to and fro substantially perpendicular to the flat bounding planes extending on the proper portions of said lattice work; and passing the thus levelled previously expanded said member through a pair of flanged truing and straightening rollers whereby the final repeatedly cold worked, levelled, and expanded said member is integrally one-piece and produced without occasioning scrap from the initial said structural member.

References Cited in the file of this patent

UNITED STATES PATENTS

| | | |
|---|---|---|
| 950,280 | Everson | Feb. 22, 1910 |
| 1,195,221 | Herr | Aug. 22, 1916 |
| 1,511,186 | Rendleman | Oct. 7, 1924 |
| 1,547,607 | Rendleman | July 28, 1925 |
| 1,746,520 | Brody | Feb. 11, 1930 |
| 1,763,944 | Bates | June 17, 1930 |
| 1,790,495 | Bates et al. | Jan. 27, 1931 |
| 1,802,811 | Gersman | Apr. 28, 1931 |
| 1,842,612 | Kahn | Jan. 26, 1932 |
| 1,850,543 | Gersman | Mar. 22, 1932 |
| 2,046,621 | Gibson | July 7, 1936 |
| 2,977,914 | Gray et al. | Apr. 4, 1961 |